March 28, 1939. E. R. SMITH ET AL 2,152,159
TIRE PRESSURE INDICATING DEVICE
Filed April 23, 1938 2 Sheets-Sheet 1
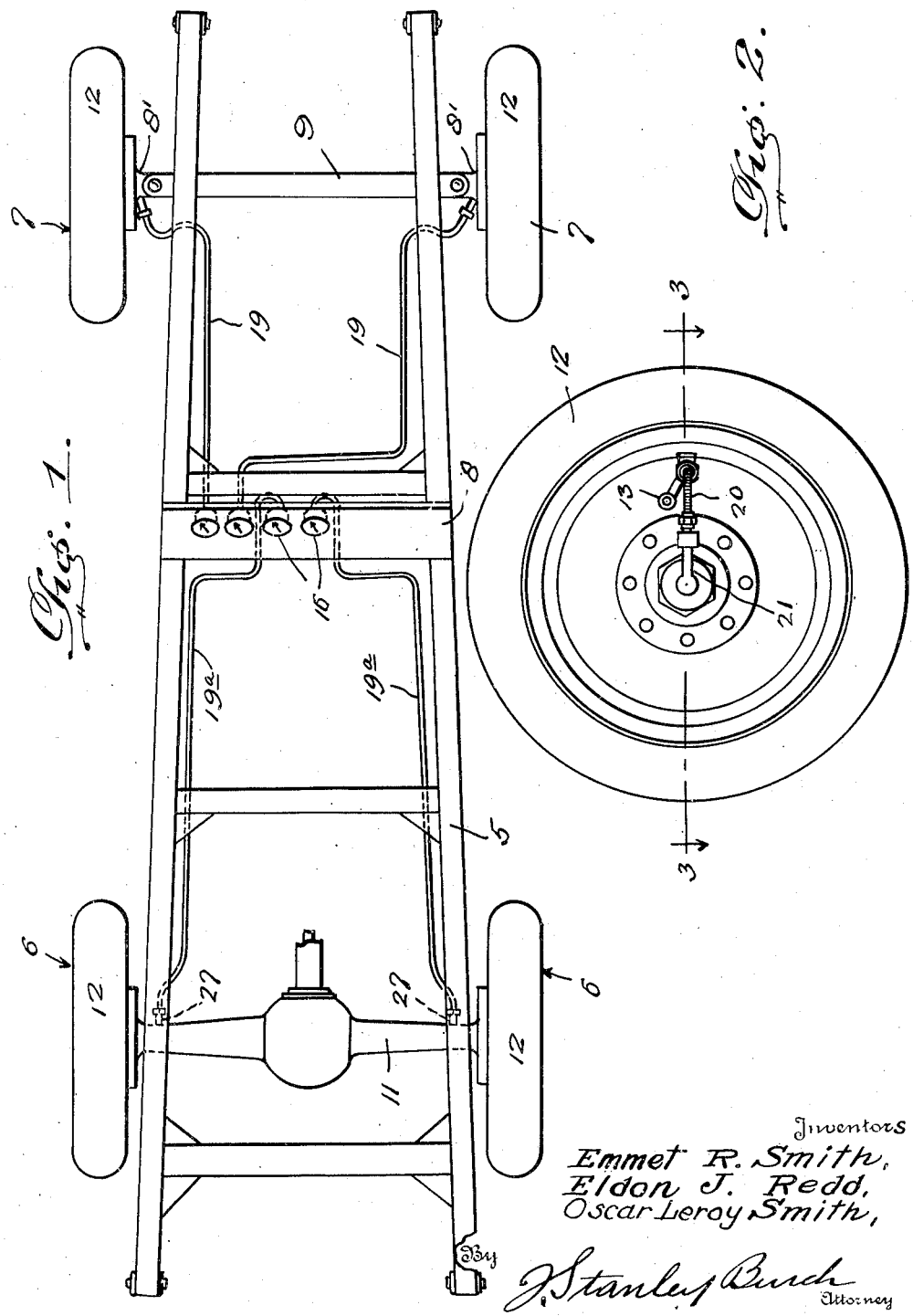
Inventors
Emmet R. Smith,
Eldon J. Redd,
Oscar Leroy Smith,
By J. Stanley Burch
Attorney

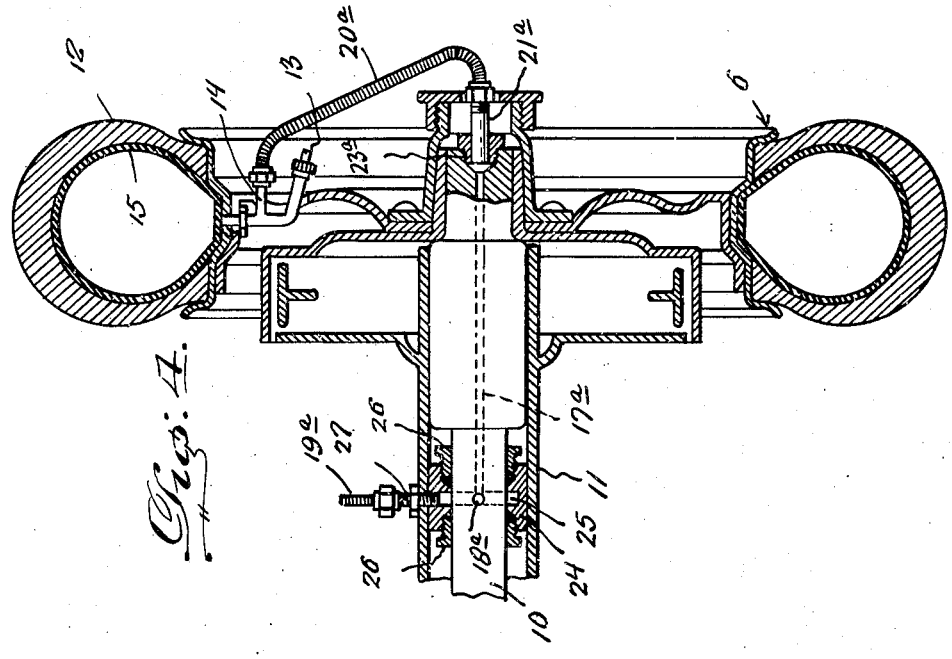
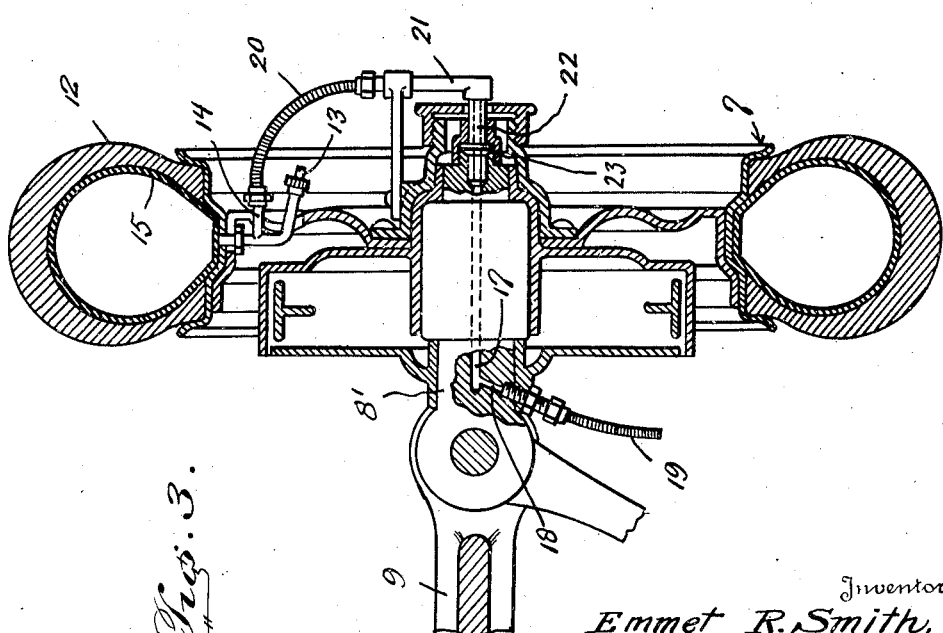

Patented Mar. 28, 1939

2,152,159

UNITED STATES PATENT OFFICE 2,152,159

TIRE PRESSURE INDICATING DEVICE

Emmet R. Smith, Sunray, Eldon J. Redd, Dalhart, and Oscar Leroy Smith, Sunray, Tex.

Application April 23, 1938, Serial No. 203,966

3 Claims. (Cl. 73—31)

This invention relates to novel means for indicating the pressure of air in each tire of an automobile, at an advantageous point on the automobile within the driver's vision, such as on the dash board, whereby the condition of the tires may be readily seen without the driver of the automobile leaving his seat to test the tires.

The primary object of the present invention is the provision of novel means for placing the tire of each wheel of the vehicle in constant communication with a pressure gage located on the dash board or at a like advantageous point on the automobile within the driver's vision.

Another object of the present invention is to provide an improved tire pressure indicator for automobiles, of the above character, which will be durable and efficient in use, simple in construction, and easy and inexpensive to manufacture and install.

The present invention consists in the novel form, combination and arrangement of parts hereinafter more fully described, shown in the accompanying drawings and claimed.

In the drawings:

Figure 1 is a plan view of an automobile chassis provided with tire pressure indicating means in accordance with the present invention.

Figure 2 is an enlarged side elevational view of one of the front wheels of the automobile chassis shown in Figure 1.

Figure 3 is an enlarged horizontal section on line 3—3 of Figure 2; and

Figure 4 is a view similar to Figure 3 of one of the rear driving wheels of the automobile chassis shown in Figure 1.

Referring in detail to the drawings, I have shown an automobile chassis including a frame 5 having rear supporting and driving wheels indicated at 6, front steering and supporting wheels 7, and a dash or instrument board 8. As usual, each front steering and supporting wheel 7 is journaled on a horizontally swinging stub axle 8' pivoted to the end of a main fixed front axle section 9, and each rear driving and supporting wheel 6 is secured on the end of a driven rear axle section 10 journaled in a rear axle housing 11. Each of the wheels 6 and 7 is equipped with a pneumatic tire 12 provided with an inflation valve 13 which, in accordance with the present invention is provided with a branch 14 at a point intermediate the end to which the inflation hose is connected and the end connected to the inner tube 15 of said tire.

Arranged on the dash or instrument board 8 of the automobile are independent pressure gages or indicators 16, one for showing the pressure in each tire of the automobile. As shown in Figures 2 and 3, the stub axle 8' of each front steering and supporting wheel 7 is provided with an axial passage 17 which opens at one end through the outer end of the stub axle, and which extends inwardly to a point beyond the inner side of the associated wheel 7 where it leads laterally or rearwardly as at 18 through the rear side of said stub axle and is connected by a tube or conduit 19 with the associated pressure gage or indicator 16. The branch 14 of the inflation valve 13 for the tire of each front wheel is connected by a flexible tubing 20 with a rigid tube or fitting 21 having a horizontal end portion 22 that extends freely inwardly through the hub of the wheel 7 and is provided with a swivel connection 23 with the stub axle 8 in communication with the passage 17. In this way, constant communication between the inner tube 15 of the wheel 7 and the associated pressure gage 16, is established, the swivel connection 23 permitting the wheel and parts 20 and 21 carried thereby to rotate relative to the stub axle 8' without disturbing the communication between the tube or fitting 21 and the passage 17 and while providing and maintaining an airtight connection where such communication is established. Obviously, the tubing or conduit 19 may be extended along the chassis frame 5 so as to be out of the way and not exposed to damage, at a point intermediate the wheel 7 and the associated gage 16. Thus, when the tire is inflated, the same pressure of air placed in the tire will also be placed in the line 19, 20 and 21 and passage 17, 18, thereby insuring exact indication of the tire pressure by the associated indicator or gage 16.

As shown in Figure 4, the connection for the rear wheels 6 is provided by forming the rear axle section 10 with an axial passage 17a which opens at one end through the outer end of said axle section 10 and whose outer section is placed in constant communication with a flexible tube 20a by means of a rigid tube or fitting 21a coupled to the outer end of axle section 10 in communication with the passage 17a as at 23a and connected at its other end with the branch 14 of the inflation valve 13 associated with the tire 12 of said wheel 6. As the axle section 10 and wheel 6 rotate together, the connection 23a need not be a swivel as is required for the front wheels at 23, and the rigid tube or fitting 21a freely extends through the hub of the wheel 6 as shown. However, a special connection is required between the inner end of passage 17a and the tubing or conduit 19a which connects said passage 17a with the associated tire pressure gage or indicator 16. This is shown clearly in Figure 4 wherein the rear axle section 10 extends through a casing 24 fitted in the rear axle housing 11 and provided with an internal annular groove 25 in constant communication with the inner end portion 18a of passage 17a that extends laterally and opens through the rear axle section 10 at one side of the latter. The groove 25 is made airtight where the axle section 10 extends therethrough by providing the ends of said casing 24 with stuffing boxes 26, and one end of the associated conduit or tube 19a is coupled to the casing 24 in communication with the groove 25, by means of a nipple 27 extending through the rear axle housing 11. Thus, constant communication is provided between the passage 17a, 18a and the tubing or conduit 19a without interfering with the rotation of shaft section 10 and while maintaining the communication leak-proof.

In operation, the air pressure within the tubings or conduits 19 and 19a will be the same as the air pressure within the pneumatic tires connected therewith, and the pressure gages or indicators 16 will consequently indicate and thus give the driver of the automobile direct knowledge of the pressure in each tire. It is obvious that minor changes can be made in the specific details of construction illustrated and described, and it will be apparent that we have provided an exceptionally simple and durable device which can be readily and easily manufactured and installed.

What we claim as new is:

1. In an automobile, the combination with an axle member, a supporting wheel mounted on said axle member and having a pneumatic tire, and an instrument board, said axle member having an axial passage opening at one end through the outer end of said axle member and at the other end through one side of the axle member inwardly of said wheel, of a pressure indicator carried by said instrument board, means establishing constant communication between the tire and the end of said axial passage at the outer end of said axle member, and means establishing constant communication between the other end of said axial passage and said indicator.

2. In an automobile, the combination with a non-rotatable axle member, a supporting wheel journaled on said axle member and having a pneumatic tire, and an instrument board, said axle member having an axial passage opening at one end through the outer end of said axle member and at the other end through one side of the axle member inwardly of said wheel, of a pressure indicator carried by said instrument board, means establishing constant communication between the tire and the end of said axial passage at the outer end of said axle member including a conduit member having a swiveled connection with the axle member, and means establishing constant communication between the other end of said axial passage and said pressure indicator.

3. In an automobile, the combination with a rotatable axle member, a supporting wheel mounted on and rotatable with said axle member and having a pneumatic tire, and an instrument board, said axle member having an axial passage opening at one end through the outer end of said axle member and at the other end through one side of the axle member inwardly of said wheel, of a pressure indicator carried by said instrument board, means establishing constant communication between the tire and the end of said axial passage at the outer end of said axle member, and means establishing constant communication between the other end of said axial passage and said pressure indicator, said last-named means including an annular casing through which said axle member extends and in which said axle member is rotatably fitted, said casing having an internal annular groove in constant communication with the last-named end of said axial passage, and conduit means connected to said casing in communication with said annular groove and extending to the pressure indicator.

EMMET R. SMITH.
ELDON J. REDD.
OSCAR LEROY SMITH.